(12) United States Patent
Gorte et al.

(10) Patent No.: US 8,021,799 B2
(45) Date of Patent: Sep. 20, 2011

(54) HIGH-PERFORMANCE CERAMIC ANODES FOR USE WITH STRATEGIC AND OTHER HYDROCARBON FUELS

(75) Inventors: Raymond J. Gorte, Narberth, PA (US); John M. Vohs, Newtown Square, PA (US); Michael D. Gross, Lewisburg, PA (US)

(73) Assignee: The Trustees Of The University Of Pennsylvania, Philadelphia, PA (US)

( * ) Notice: Subject to any disclaimer, the term of this patent is extended or adjusted under 35 U.S.C. 154(b) by 1073 days.

(21) Appl. No.: 11/777,157

(22) Filed: Jul. 12, 2007

(65) Prior Publication Data

US 2008/0090127 A1    Apr. 17, 2008

Related U.S. Application Data

(60) Provisional application No. 60/807,130, filed on Jul. 12, 2006, provisional application No. 60/941,937, filed on Jun. 4, 2007.

(51) Int. Cl.
*H01M 4/86* (2006.01)
*H01M 4/88* (2006.01)
*H01M 4/90* (2006.01)
*C25B 11/04* (2006.01)
*C25B 11/06* (2006.01)

(52) U.S. Cl. ........ 429/528; 429/534; 429/523; 429/479; 429/480; 429/483; 429/484; 429/485; 429/486; 429/489; 429/496; 204/283; 204/284; 204/290.01; 204/290.1; 204/290.12; 204/290.13; 204/290.14; 204/291

(58) Field of Classification Search ............... 429/479, 429/480, 481, 482, 483, 484, 485, 486, 489, 429/496, 523, 528, 534; 204/283, 284, 290.01, 204/290.1, 290.12, 290.13, 290.14, 291
See application file for complete search history.

(56) References Cited

U.S. PATENT DOCUMENTS

| | | | |
|---|---|---|---|
| 6,548,203 B2 * | 4/2003 | Wallin et al. | 429/489 |
| 2003/0035989 A1 | 2/2003 | Gorte et al. | |
| 2004/0043272 A1 | 3/2004 | Gorte et al. | |
| 2004/0185327 A1 * | 9/2004 | Gorte et al. | 429/45 |
| 2005/0202308 A1 | 9/2005 | Takahashi et al. | |
| 2005/0250000 A1 * | 11/2005 | Marina et al. | 429/40 |

* cited by examiner

*Primary Examiner* — Bruce Bell
(74) *Attorney, Agent, or Firm* — Woodcock Washburn, LLP

(57) ABSTRACT

The embodiments generally relate to a high performance ceramic anode which will increase flexibility in the types of fuels that may be used with the anode. The embodiments further relate to high-performance, direct-oxidation SOFC utilizing the anodes, providing improved electro-catalytic activity and redox stability. The SOFCs are capable of use with strategic fuels and other hydrocarbon fuels. Also provided are methods of making the high-performance anodes and solid oxide fuel cells comprising the anodes exhibiting improved electronic conductivity and electrochemical activity.

9 Claims, 14 Drawing Sheets

Figure 6.

| sample | fuel* | 923 K | | 973 K | | 1023 K | | 1073 K | |
|---|---|---|---|---|---|---|---|---|---|
| | | $P_{max}$ mW cm$^{-2}$ | $R_\Omega$ $\Omega$ cm$^2$ | $P_{max}$ mW cm$^{-2}$ | $R_\Omega$ $\Omega$ cm$^2$ | $P_{max}$ mW cm$^{-2}$ | $R_\Omega$ $\Omega$ cm$^2$ | $P_{max}$ mW cm$^{-2}$ | $R_\Omega$ $\Omega$ cm$^2$ |
| 12 μm Pd-Ce-YSZ | H2 | 249 | 0.76 | 401 | 0.49 | 646 | 0.31 | 865 | 0.2 |
| 12 μm Ce-YSZ | H2 | | | 88 | 0.55 | 144 | 0.38 | 261 | 0.27 |
| 50 μm Pd-Ce-YSZ | H2 | 148 | 1.11 | 224 | 0.74 | 335 | 0.44 | 408 | 0.29 |
| 12 μm LST-Pd-Ce-YSZ | H2 | 203 | 0.95 | 339 | 0.58 | 509 | 0.37 | 653 | 0.24 |
| | CH4 | | | 208 | 0.45 | 335 | 0.27 | 539 | 0.2 |

*fuels were humidified (3% H$_2$O).

(a)

(b)

HIGH-PERFORMANCE CERAMIC ANODES FOR USE WITH STRATEGIC AND OTHER HYDROCARBON FUELS

This application claims priority under 35 U.S.C. §119(e) to U.S. Provisional Application No. 60/807,130, filed Jul. 12, 2006, and U.S. Provisional Application No. 60/941,937, filed Jun. 4, 2007, the disclosures of which are incorporated by reference herein in their entirety.

FIELD OF THE INVENTION

Embodiments relate to solid oxide fuel cells (SOFCs), SOFC electrodes, and methods of making and using thereof. Specifically, the embodiments relate to high performance ceramic anodes that will increase flexibility in the types of fuels that can be used with the fuel cells and to methods for producing the ceramic anodes in order to achieve this high performance and fuel flexibility.

DESCRIPTION OF RELATED ART

Solid oxide fuel cells (SOFC) have grown in recognition as a viable high temperature fuel cell technology. Generally, a SOFC includes an air electrode (cathode), a fuel electrode (anode), and a solid oxide electrolyte provided between these two electrodes. An operating temperature of greater than about 600° C. allows use of hydrocarbon fuels, promotes rapid kinetics of the electrode reactions using non-precious materials, and produces high quality by-product heat for cogeneration or for use in a bottoming cycle. The high operating temperature of the solid oxide fuel cell, however, places stringent requirements on its fabrication materials. Because of the high operating temperatures of conventional solid oxide fuel cells (approximately 600 to 1000° C.), the materials used to fabricate the cell components are limited by thermal stability in oxidizing and reducing environments, thermal stability of contacting materials, conductivity, and thermomechanical compatibility.

The electrolyte of a solid oxide fuel cell is made primarily from solid ceramic materials that are capable of surviving the high temperature environment typically encountered during operation of solid oxide fuel cells. The electrolyte is generally made of an oxide, such as dense yttria-stabilized zirconia (YSZ), that is a nonconductor of electrons thereby ensuring that the electrons pass through the external circuit to do useful work. As such, the electrolyte provides a voltage buildup on opposite sides of the electrolyte, while isolating the fuel and oxidant gases from one another. The anode and cathode are generally porous, with the cathode oftentimes being made of doped lanthanum manganite (LSM), doped lanthanum ferrate (LSF), or doped lanthanum cobaltate (LSCo).

The most common anode material for SOFC is a ceramic-metallic (cermet) composite of Ni and YSZ. N. Q. Minh, *J. Am. Ceram. Soc.* 76, 563 (1993). The Ni provides the required electronic conductivity and catalytic activity for $H_2$ oxidation, as well as promoting the steam-reforming and water-gas-shift reactions required for hydrocarbon fuels. The YSZ in the composite maintains thermal stability of the electrode against Ni sintering and provides paths for transport of $O^{2-}$ ions from the electrolyte into the electrode. These ion-conducting pathways are crucial for increasing the length of the three-phase boundary (TPB), the zone where the electrochemical reaction occurs. C. W. Tanner, K.-Z. Fung, A. V. Virkar, *JECS*, 22, 144 (1997); Virkar, A. V.; Fung, K. Z.; Tanner, C. W. U.S. Pat. No. 5,543,239 (1996). (The TPB is the region where the gas phase, the ionic conductor, and the electronic conductor meet.)

These Ni-cermets perform well with hydrogen ($H_2$) fuel and allow internal steam reforming of hydrocarbons to produce syngas ($CO+H_2$) if there is sufficient water in the feed to the anode. Because Ni catalyzes the formation of graphite fibers in dry methane, it is necessary to operate anodes made using nickel at steam/methane ratios greater than one. In contrast, dry hydrocarbon fuels cannot be oxidized directly in a SOFC with a Ni-based electrode since Ni catalyzes the formation carbon fibers which rapidly degrade the anode. Several attempts have been made to optimize the performance of Ni-based electrodes for direct utilization of hydrocarbons such as by modifying the operating conditions, substituting other electronically conductive materials for Ni, and adding catalysts. However, none of these approaches has been commercially successful.

Solid oxide fuel cells having anodes that do not catalyze the formation of carbon fibers may be capable of converting the chemical energy of carbon-containing fuels (e.g., methane, gasoline, JP-8, etc.) to electrical energy with significantly higher efficiencies than fuel cells that require the fuel to be reformed to syngas, a mixture of CO and $H_2$, prior to oxidizing the fuel. Furthermore, such solid oxide fuel cells remove the need for a reformer allowing for simplification of the fuel-cell system.

It has recently been shown that it is possible to use hydrocarbon fuels directly when Ni is replaced with an electronic conductor that does not catalyze the formation of carbon fibers e.g., Cu or a Cu-containing metal mixture. See, U.S. Pat. Nos. 6,589,680; 6,811,904; 6,844,099; and 6,939,637, the disclosures of which are incorporated by reference herein in their entireties. The Cu or Cu-containing mixture is believed to provide electronic conductivity and possibly catalytic activity in the electrode. Direct utilization of liquid fuels in SOFC has also been demonstrated with anodes based on Cu-ceria composites and with anodes comprised primarily of ceramic material. See, U.S. Patent Application Publication No. 2004/0043272, U.S. Patent Application Publication No. 2004/0185327, U.S. Patent Application Publication No. 2003/0035989, and "Direct oxidation of hydrocarbons in a solid-oxide fuel cell", S. Park, J. M. Vohs, and R. J. Gorte, *Nature*, 404, 265 (2004), the disclosures of which are incorporated by reference herein in their entireties. Furthermore, the oxidation of methane in a solid oxide fuel cell using a $CeO_2$-based anode has been disclosed. See, U.S. Pat. No. 5,350,641, the disclosure of which is incorporated by reference herein in its entirety.

When using hydrocarbon fuels that are liquids at room temperature (e.g., gasoline, JP-8, etc.) with cells that are capable of direct oxidation, it is essential to operate the SOFC below approximately 800° C., or the temperature at which tar formation due to gas-phase pyrolysis begins to dominate. See, "A study of carbon formation and prevention in hydrocarbon-fueled SOFC", Kim T, Liu G, Boaro M, Lee S I, Vohs J M, Gorte R J, Al-Madhi O H, Dabbousi B O, *J. Power Sources*, 155, 231 (2006). Unfortunately, ceramic anodes tend to exhibit poor electro-catalytic activity at these relatively low temperatures. In addition, Cu-based anodes can be limited by deactivation due to high-temperature sintering and redox instability.

Thus, it is a feature of an embodiment to provide high-performance, direct-oxidation SOFC with improved electro-catalytic activity and redox stability capable of use with strategic fuels and other hydrocarbon fuels. It is a further feature of an embodiment to provide methods of making high-performance solid oxide fuel cells comprising an anode exhibiting improved electronic conductivity and electrochemical activity.

Throughout this disclosure, including the foregoing description of related art, any and all publicly available documents described herein, including any and all U.S. patents and publications, are specifically incorporated by reference herein in their entirety. The foregoing description of related art is not intended in any way as an admission that any of the documents described therein, including pending United States patent applications, are prior art to the presently disclosed embodiments. Moreover, the description herein of any disadvantages associated with the described products, methods, and/or apparatus, is not intended to limit the embodiments to their exclusion. Indeed, certain embodiments may include certain features of the described products, methods, and/or apparatus without suffering from their described disadvantages.

SUMMARY

It would be desirable to provide a solid oxide fuel cell that has high fuel efficiency, high power density at intermediate temperatures (650 to 800° C.), and that is capable of directly oxidizing hydrocarbons. It also would be desirable to provide ceramic anode materials, and methods of preparing the ceramic anode materials for use in solid oxide fuel cells, whereby the ceramic anode exhibits improved electro-catalytic activity and redox stability capable of use with strategic fuels. A feature of an embodiment, therefore, is to provide a solid oxide fuel cell that has high fuel efficiency, high power density, and that is capable of directly oxidizing hydrocarbons, as well as ceramic anode materials, methods of making the ceramic anode materials, and methods of making the solid oxide fuel cells.

In accordance with these and other features of various embodiments, there is provided a ceramic anode comprising a catalytically reactive layer that is adjacent to and in contact with the electrolyte and that has a conductivity of less than 10 S/cm.

In accordance with an additional feature of an embodiment, there is provided a method of making a ceramic anode comprising a catalytically reactive layer that is adjacent to and in contact with the electrolyte and that has a conductivity of less than 10 S/cm.

In accordance with another feature of an embodiment, there is provided a solid oxide fuel cell comprising a solid electrolyte, a cathode material, and a ceramic anode comprising a catalytically reactive layer that is adjacent to and in contact with the electrolyte and that has a conductivity of less than 10 S/cm.

In accordance with yet another feature of an embodiment, there is provided a method of making a solid oxide fuel cell comprising forming a dense electrolyte material having at least two opposing surfaces, contacting one of the surfaces with a cathode material, contacting the opposing surface with a first ceramic anode material that includes at least a catalytic component, and contacting the open surface of the first ceramic anode material with a second electronically conductive material.

These and other features and advantages of the preferred embodiments will become more readily apparent when the detailed description of the preferred embodiments is read in conjunction with the attached drawings.

DESCRIPTION OF FIGURES

FIG. 6. Comparison of maximum power densities and ohmic resistances of cells with thin electro-catalytic layer anodes.

DETAILED DESCRIPTION OF THE PREFERRED EMBODIMENTS

Figure 1:
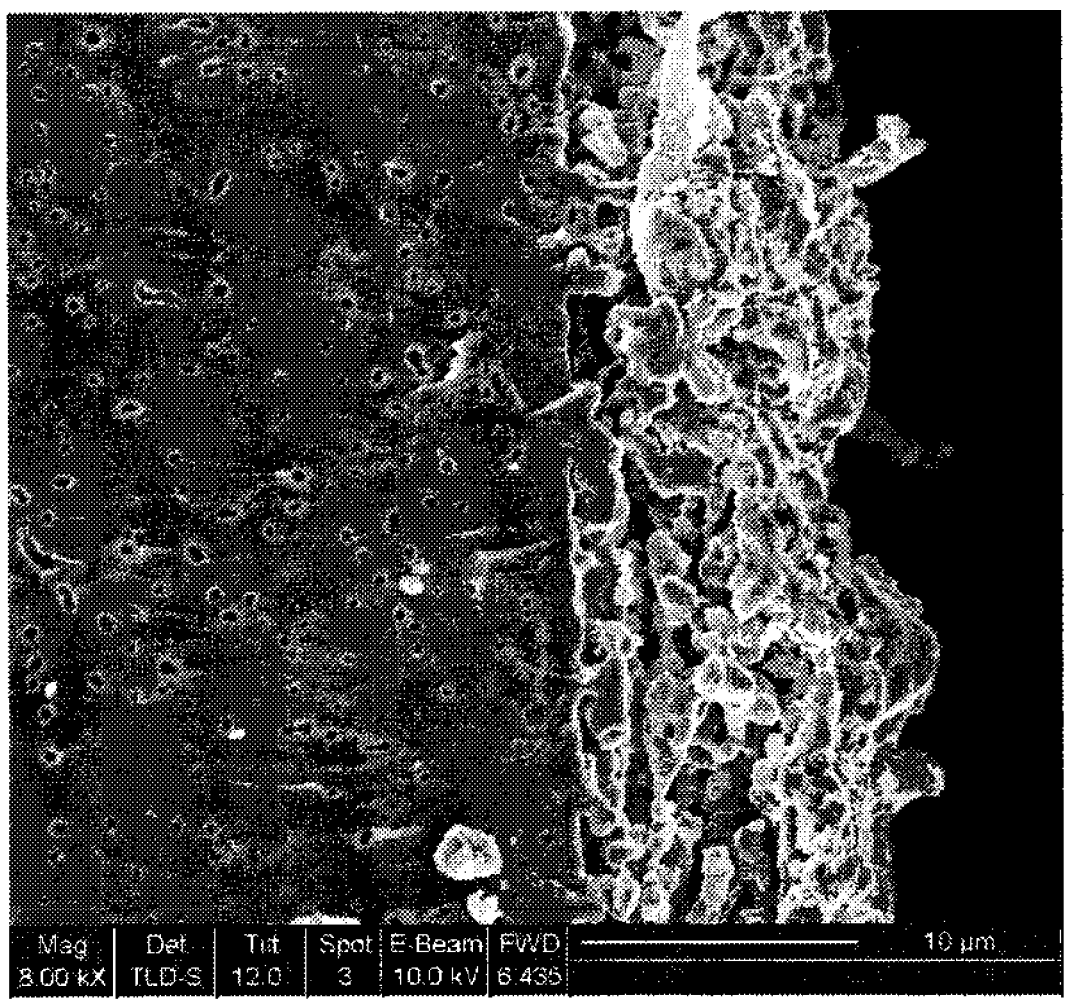
FIG. 1. Scanning electron micrograph (SEM) of porous YSZ-dense YSZ interface prepared by tape casting.

Ceramic anodes for SOFC exhibit many desired properties such as providing sulfur tolerance and redox stability, as well as allow direct utilization of hydrocarbon fuels. It is possible to achieve high performance by using an anode with a very thin electro-catalytic layer that is optimized for its catalytic activity, even though its electronic conductivity is low, so long as a relatively highly electro-conductive layer is placed above it. Accordingly, the embodiments preferably include an anode, a method of making the anode, and a solid oxide fuel cell containing the anode.

Before the present solid oxide fuel cell, electrodes, anodes, and cathodes are described, it should be understood that the embodiments described herein are not limited to the particular methodology or materials described, as these may vary. It also is to be understood that the terminology used herein is for the purpose of describing particular embodiments only, and is not intended to limit the scope of the present invention, which will be limited only by the appended claims.

The terminology used herein is for the purpose of describing particular embodiments only, and is not intended to limit the scope of the present invention. As used throughout this disclosure, the singular forms "a," "an," and "the" include plural reference unless the context clearly dictates otherwise. Thus, for example, a reference to "a solid oxide fuel cell" includes a plurality of such fuel cells in a stack, as well as a single cell, and a reference to "an anode" is a reference to one or more anodes and equivalents thereof known to those skilled in the art, and so forth.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods, devices, and materials are now described. All publications mentioned herein are cited for the purpose of describing and disclosing the various anodes, electrolytes, cathodes, and other fuel cell components that are reported in the publications and that might be used in connection with the invention. Nothing herein is to be construed as an admission that the invention is not entitled to antedate such disclosures by virtue of prior invention.

According to an exemplary embodiment, an electrochemical cell, such as a SOFC, comprises an air electrode (cathode), a fuel electrode (anode), and a solid oxide electrolyte disposed between these two electrodes. In a SOFC, the electrolyte is in solid form. The SOFC of the present embodiments can include any solid electrolyte made using techniques disclosed in the art. The present embodiments are not limited to any particular material used for the electrolyte, nor is it particularly limited to their respective methods of manufacture. Any material now known or later discovered can be used as the electrolyte material.

The anode and cathode are typically porous. The SOFC of the present embodiments can include any cathode made using techniques disclosed in the art. The present embodiments are not limited to any particular material used for the cathode, nor is it particularly limited to their respective methods of manufacture. Any material now known or later discovered can be used as the cathode material. The cathode is typically made of doped lanthanum manganite (LSM), doped lanthanum ferrite (LSF), or doped lanthanum cobaltate (LSCo).

According to a preferred embodiment, the cathode may be prepared by impregnation of conducting perovskites into a thick (relative to the electrolyte) porous YSZ layer. See "Fabrication of Sr-doped LaFeO(3)YSZ composite cathodes", Huang Y Y, Vohs J M, Gorte R J, *J. Electrochemical Society*, 151, A646 (2004). Cathode materials useful in the invention include composites with Sr-doped $LaMnO_3$, $LaFeO_3$, and $LaCoO_3$, or metals such as Ag. Preferred embodiments of the cathode for use in the SOFC are described in U.S. Pat. No. 6,958,196, the disclosure of which is incorporated by reference herein in its entirety.

The inventive anode of the present embodiments includes at least two porous layers: 1) a thin "electro-catalytic layer" adjacent to and in contact with the electrolyte and 2) a relatively thick "electro-conductive layer" in contact with the electro-catalytic layer and positioned on a side of the electro-catalytic layer opposite the electrolyte.

The thickness of the electro-catalytic layer preferably is about the size of the triple phase boundary (TPB) region. According to preferred embodiments, the electro-catalytic layer has a thickness of from about 1 μm to about 50 μm, more preferably from about 5 μm to about 20 μm, and most preferably about 10 μm. The thickness of the electro-conductive layer preferably is about 5 to about 50 times the thickness of the electro-catalytic layer, more preferably from about 5 to about 20 times the thickness of the electro-catalytic layer, and most preferably about 10 times the thickness of the electro-catalytic layer. According to preferred embodiments, the electro-conductive layer has a thickness of from about 50 μm to about 1000 μm, more preferably from about 100 μm to about 500 μm, and most preferably about 100 μm.

The electro-catalytic layer of the anode preferably is made from a layer of porous ceramic electrolyte material. The electro-catalytic and electro-conductive layers of the anode may be made from the same material but more generally will be made from different materials. However, the porous anode still requires sufficient conductivity. The electro-catalytic layer is designed to be catalytically reactive and requires only minimal conductivity. For example, if one requires that the losses in the anode be less than 0.1 ohm-$cm^2$, then an electrode that is 10 μm thick need only have a conductivity greater than only 0.01 seimens/cm. (The layer could, or course, have higher conductivity.) Thus, materials that display minimal conductivity or semi-conductivity are sufficient for the electro-catalytic layer. The primary electronic conduction in the anode may be achieved in the electro-conductive layer adjacent to and in contact with the electro-catalytic layer. The material for the electro-conductive layer can be selected for its conductivity and for property matching (such as thermomechanical stability) with the electro-catalytic layer. In this manner, materials for the electro-catalytic layer and electro-conductive layer of the anode may be chosen such that task or purpose of the respective layers is optimized, separately.

Preferably, the materials useful in forming the electro-conductive layer exhibit sufficient electronic conductivity and have a Coefficient of Thermal Expansion (CTE) similar to the material used in the electro-catalytic layer. Preferably, the CTE ratio of the CTE for the material used for the electro-catalytic layer to the CTE for the material used for the electro-conductive layer is from about 0.95 to about 1.05, more preferably from about 0.98 to about 1.02, and most preferably about 1.

The preferred material for the electrolyte is YSZ, a robust material that can tolerate a wide range of temperatures and partial pressures of oxygen ($P(O_2)$). In addition, materials other than stabilized YSZ may be used, including Gc- and Sm-doped ceria (10 to 100 wt %), Sc-doped $ZrO_2$ (up to 100 wt %), doped $LaGaMnO_x$, and other electrolyte materials.

The electro-catalytic layer of the anode preferably is made of a porous layer of the electrolyte material with the addition of catalytic materials. Accordingly, the electro-catalytic layer of the anode preferably is based on YSZ. Preferred materials that can be added as catalysts include $CeO_2$, doped $CeO_2$, $CeO_2$—$ZrO_2$ mixtures, $Pr_6O_{11}$, $TbO_2$, etc. Preferably, these catalytic oxides may be doped with small amounts of catalytic metal to increase their catalytic activity. Examples of catalytic metals include precious metals (e.g., platinum, palladium, rhodium, ruthemium, etc.), semi-precious metals (e.g., nickel, iron, cobalt, copper, etc.), and mixtures or combinations thereof. According to preferred embodiments, the catalysts for the oxidation reaction are $CeO_2$ or $CeO_2$ with dopant levels of Pd, Pt, Ru, Rh, Co, Fe, or Ni. More preferably, the catalysts are $CeO_2$ or $CeO_2$ with Pd, Pt, Rh. Ceria may loose conductivity when heated to high temperatures. The material utilized in the porous matrix of the anode may comprise a mixture of YSZ and additional components, such as $La_{0.3}Sr_{0.7}TiO_3$ (LST), to prevent this loss of conductivity.

The current collection layer of the anode can be optimized for maximum electronic conductivity. Preferred ceramics for use in the embodiments include, but are not limited to ceria, doped ceria such as Gd or Sm-doped ceria, $LaCrO_3$, $SrTiO_3$ and $SrTiO_3$ containing rare earth dopants (i.e. Y, La, Pr, Sm, Nd, Gd, or Yb), Sr-doped $LaCrO_3$, $Nb_2TiO_7$, $Gd_2Ti(Mo,Mn)O_7$ and mixtures thereof. It is understood that the embodiments are not limited to these particular ceramic materials, and that other ceramic materials may be used in the anode alone or together with the aforementioned ceramic materials. Additional layers for the current collection layer include metals such as copper, silver and stainless steel. In one embodiment, the electro-conducting layer does not contain a ceramic (e.g., it is made entirely of metal). In some cases the electro-conducting layer will be made as an integral part of the anode, and in others it will be an external component merely placed in close physical contact with the electro-catalytic layer.

The initial step in preparing anodes will be the fabrication of a porous layer of electrolyte material (e.g., YSZ). The electro-catalytic layer can be made in conjunction with the electrolyte such that the porous electrolyte material of electro-catalytic layer is attached to a dense electrolyte, as shown in FIG. 1. Alternatively, the electro-catalytic layer may be prepared separately from the electrolyte. In addition, the porous electro-catalytic layer may be prepared together with the porous electro-conductive layer. Methods of fabricating the porous layers are described in more detail herein.

The electro-catalytic layer of the anode preferably is prepared by impregnating the porous ceramic material with a catalytic component, although the porous electro-catalytic layer could be made using other techniques known to those skilled in the art, such as conventional cermet forming techniques. The catalytic components may be any material that can provide sufficient, albeit minimal, electronic conductivity for conduction paths equal to or about the thickness of the electro-catalytic layer.

The layer may be impregnated with (or otherwise contain) one or more catalysts, such that there may be a primary catalyst and a supplementary catalyst or catalysts. The concentration of the primary catalyst typically will be greater than each supplementary catalyst. According to preferred embodiments, the concentration of the primary catalyst in the layer is from about 10% to about 50% by weight, preferably from about 20% to about 40% by weight, more preferably from about 25% to about 40% by weight. The most preferred concentration of the primary catalyst is about 40% by weight. $CeO_2$ is an example of a preferred primary catalyst.

According to preferred embodiments, the concentration of the supplementary catalyst in the electro-catalytic layer is from about 0.01% to about 3% by weight, preferably from about 0.5% to about 2% by weight, more preferably from about 0.8% to about 1.5% by weight. The most preferred concentration of the supplementary is about 1% by weight. Precious metals, such as Pd or Pt, are preferred supplementary catalysts.

One advantage of the anode of the present embodiments is the physical separation between the electro-catalytic and electron-conduction functions of the anode, which allows each function to be tested and optimized separately. For example, for the optimization of the electro-catalytic layer, almost any oxide can be added to the porous layer and the addition of dopant levels of precious metals (e.g., Pt or Pd) would not be prohibitively expensive. See "Effect of precious-metal dopants on SOFC anodes for direct utilization of hydrocarbons", S. McIntosh, J. M. Vohs, R. J. Gorte, *Electrochemical & Solid-State Letters*, 6, A240 (2003). Furthermore, the effect of composition on the performance can be easily tested by using metal paste for current collection. Similarly, because the electro-conductive layer need not be catalytic, the main focus of optimization experiments can be on conductivity measurements and studies of the interface with the electro-catalytic layer.

Method of Making the Anode

Another feature of an embodiment includes a method of making a SOFC comprising the above-described anode. The electrode/electrolyte structure of the fuel cell and the bi-layer structure of the anode may be prepared by any suitable method, some of which are exemplified directly below. For example, an unsintered mixture of electronically-conductive and ionically-conductive materials may be deposited on a layer comprising a sintered or unsintered ionically-conductive electrolyte material prior to being sintered, to ensure sufficient contact between the layers, as illustrated in the process of a second aspect of the invention. In one embodiment of such a process, the mixture of electrolyte material with pore formers is deposited on an unsintered layer of electrolyte material and the mixture and electrolyte layer are sintered simultaneously. In another embodiment, the mixture is deposited on a previously sintered layer of electrolyte, and then sintered.

The mixture of ionically-conductive and electronically-conductive particles may be applied to the layer comprising particles of an electrolyte material (hereafter "electrolyte layer"), by any suitable means such as, for example, tape casting methods, screen-printing or silk-screening a slurry of the material(s) onto the electrolyte structure. Other means of forming the electrode/electrolyte structure (e.g., cathode/electrolyte and anode electro-catalytic layer/electrolyte) are tape calendering and slip casting. Tape calendering generally includes the steps of forming an electronically conductive tape from an electronically conductive component as well as forming an electrolyte tape from an electrolyte component. The tapes can then be rolled together to form a multilayer composite tape. In slip casting, a slurry of a conductive ceramic material and a liquid vehicle such as water, optionally with an organic binder and surfactants preferably is cast into a mold to provide the desired shaped article. The specific amounts of ceramic material, organic binder and liquid vehicle can be varied depending on the density desired in the cast product. The resulting cast product then can be dried and fired by conventional means to produce the desired electrode. See, for example, U.S. Pat. No. 6,270,536 to Minh, and U.S. Pat. No. 5,670,270 to Wallin, the entire disclosures of which patents are incorporated herein by reference.

Another feature of an embodiment includes a method of making the inventive anode substrate described above. In accordance with a preferred method of forming the anode electro-catalytic layer/electrolyte interface, it is preferred first to form a powder of a ceramic material (e.g., YSZ), and then tape casting the powder to form a two-layer, green tape of a ceramic material (e.g., YSZ) (one layer for the electro-catalytic layer of the anode and the other for the electrolyte).

Figure 8:
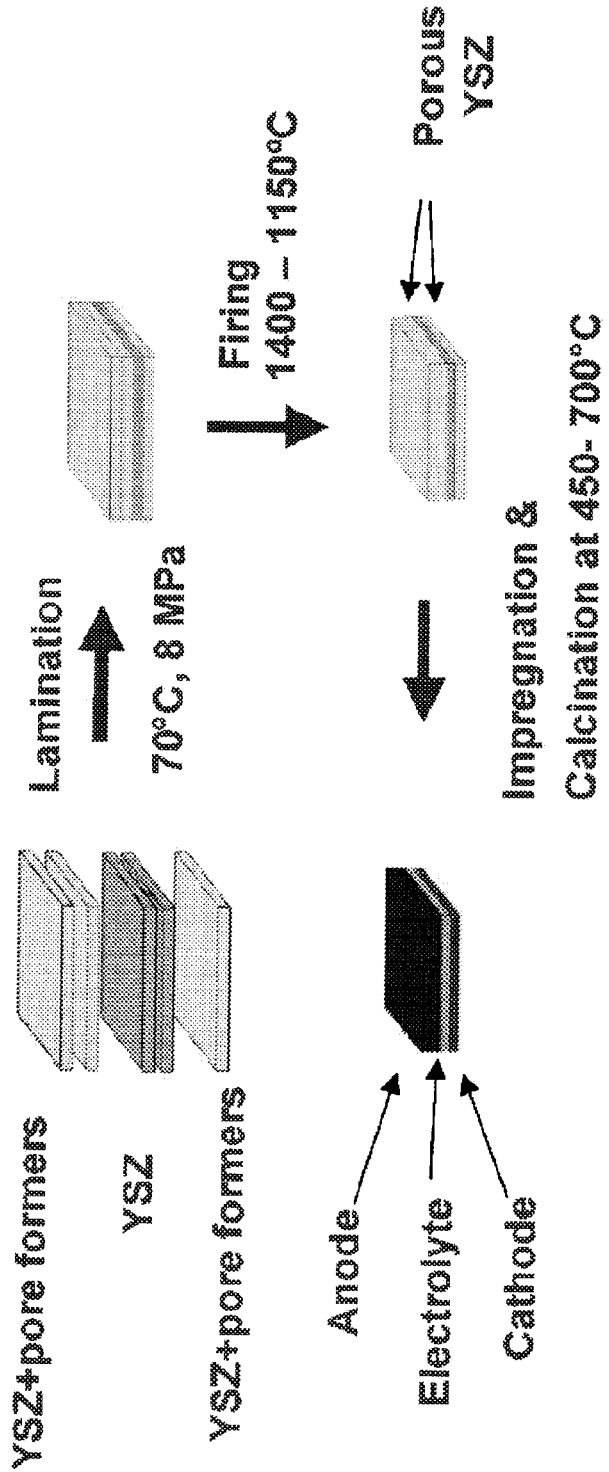
FIG. 8. Description of synthesis of a three-layer anode substrate using laminated tapes.

A three-layer green tape also could be formed with one layer for the electrolyte, one for the electro-catalytic layer of the anode, and the third for the electro-conductive layer of the anode, as exemplified in FIG. 8. The green tape then preferably is sintered at temperatures within the range of from about 1,000 to about 1,800° C., preferably from about 1,250 to about 1,550° C., and most preferably from about 1,400 to about 1,550° C. to form a porous YSZ material in contact with a dense layer of YSZ. The porosity of the porous material of the electro-catalytic layer and electro-conductive layer preferably is within the range of from about 45% to about 90%, more preferably within the range of from about 50% to about 80% and most preferably about 70%, by water-uptake measurements, (Kim, H., et al., J. Am. Ceram. Soc., 85, 1473 (2002)). Sintering the tape in this manner preferably results in a YSZ substrate having a dense side, approximately 2 to about 150 µm thick, more preferably about 10 µm thick, whereby the dense side represents the electrolyte. FIG. 1 shows a scanning electron micrograph (SEM) of porous YSZ-dense YSZ interface prepared by tape casting.

The porous ceramic material of the electro-catalytic layer of the anode may then be impregnated with catalytic components. Catalytic components may be impregnated into the porous YSZ using any method known in the art. Methods for incorporating catalytic components into the porous ceramic materials include, by way of example, impregnation of soluble salts, vapor phase deposition, and electro-deposition. See U.S. application Ser. No. 11/247,998, the disclosure of which is incorporated by reference herein in its entirety. Alternatively, the electro-catalytic layer can be made using conventional cermet-forming techniques, whereby subsequent impregnation is not necessary. The electro-catalytic layer can be impregnated with the catalytic component such that the catalytic component(s) coat at least a portion of the plurality of pores of the porous ceramic material. For example, the porous YSZ portion can be impregnated with an aqueous solution of $Ce(NO_3)_3 \cdot 6H_2O$ and then calcined at a temperature sufficient to decompose the nitrate ions. Preferably, calcination is carried out at a temperature within the range of from about 300 to about 1000° C., more preferably from about 400 to about 600° C., and most preferably about 450° C. An aqueous solution containing the metal then may be applied to the porous layer and calcined at or about the same temperature.

Figure 2:
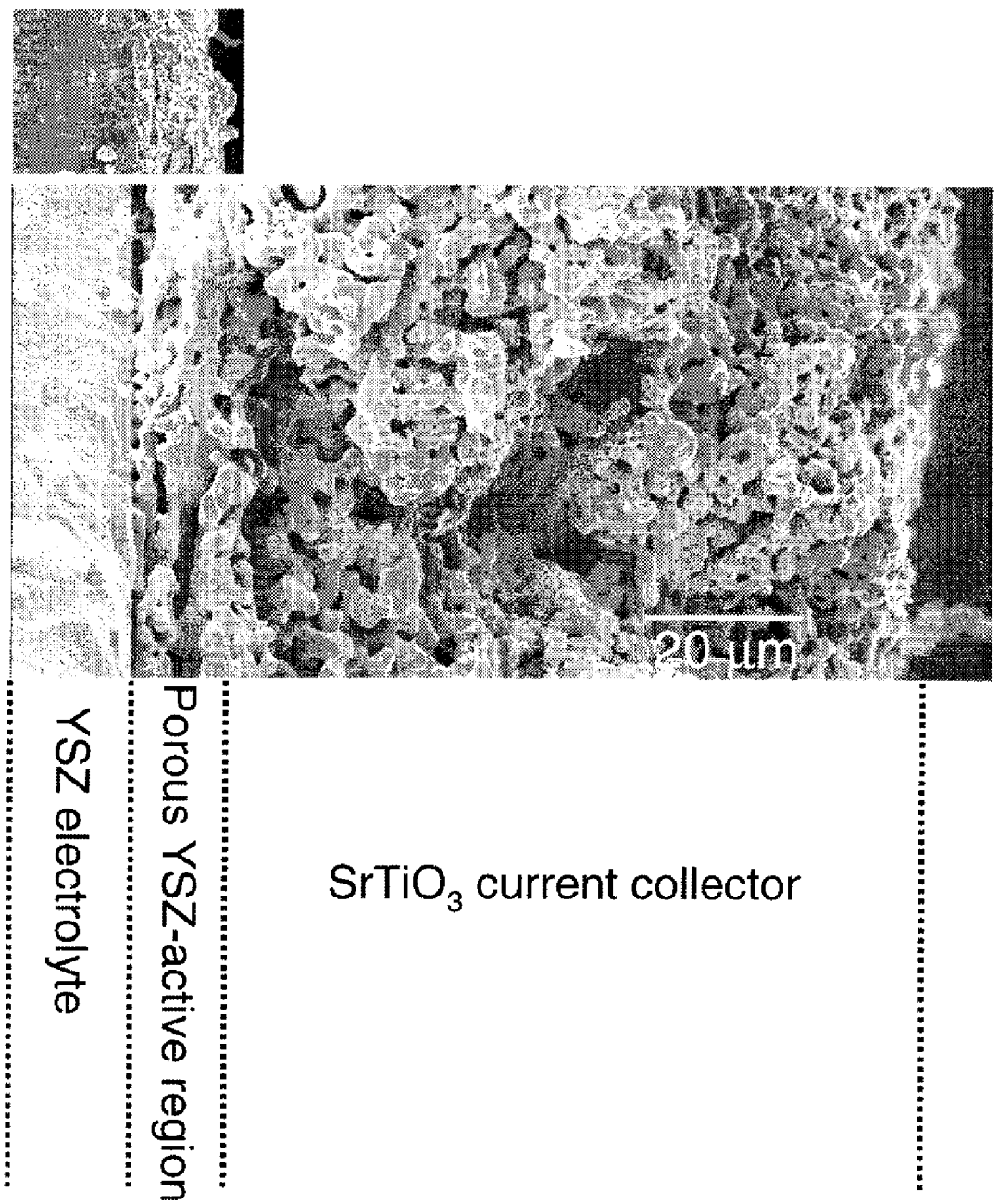
FIG. 2. Scanning electron micrograph (SEM) illustrating the dense YSZ of the electrolyte, porous YSZ of the electro-catalytic layer of the anode, and the porous ceramic material (i.e., $SrTiO_3$) of the electro-conductive layer, or current collector.

The electro-conductive layer of the anode can be prepared by any method disclosed or known by skilled practitioners in the art. The electro-conductive layer can be formed on the side of the electro-catalytic layer such that the electro-catalytic layer of the anode is positioned between the electrolyte and the electro-conductive layer of the anode. FIG. 2 provides an illustration of the anode electro-conductive layer/anode electro-catalytic layer/electrolyte structure. FIG. 2 shows the dense YSZ of the electrolyte, porous YSZ of the electro-catalytic layer of the anode, and the porous La-doped $SrTiO_3$ of the electro-conductive layer, or current collecting layer.

It is preferred in the embodiments that the electrolyte and cathode be prepared by any method disclosed or known by skilled practitioners in the art. For example, the electrolyte and cathode be prepared first by tape casting the respective layers into green tapes, and sintering the multi-layered tape at conventional sintering temperatures to form a porous cathode material and a relative dense electrolyte layer. The respective thicknesses of the layers can vary, and skilled artisans are capable of fabricating a cathode-supported electrolyte having a wide variety of thicknesses, using the guidelines provided herein. The anode layer then is formed on the side of the electrolyte opposite from the cathode, using the techniques described above.

Alternatively, where the anode electro-catalytic layer/electrolyte structure is prepared first, the cathode may be formed by applying the cathode composition, e.g., a mixture of YSZ and $La_{0.8}Sr_{0.2}MnO_3$, as a paste onto the electrolyte and then calcining the cathode at a temperature within the range of from about 1,000 to about 1,300° C., more preferably within the range of from about 1,150 to about 1,250° C., and most preferably about 1,200° C.

Strategic and Other Hydrocarbon Fuels

In a solid oxide fuel cell, hydrogen or a hydrocarbon is commonly the fuel and oxygen or air is used as the oxidant. The term "oxygen source," as used herein, refers to air and oxygen in more purified form than present in air. The term "fuel," as used herein, refers to hydrogen and any hydrocarbon fuel, wherein hydrocarbon is defined as any flammable compound that consists of, or includes as primary elements, hydrogen, carbon and oxygen.

Conventional fuel cells have traditionally used hydrogen as a fuel source. The solid oxide fuel cells of the preferred embodiment are intended to be operated with a wide variety of hydrocarbon fuels, including mixtures of these fuels. Sulfur-containing hydrocarbons also can be used. Possible fuels include, without limitation, petroleum distillates such as gasoline, diesel, naphtha, JP-4, JP-5, JP-8, kerosene, motor oil, natural gas and fuel oil. Other preferred hydrocarbons and derivatives include alcohols, including ethanol and methanol, and methane (no steam or water vapor added), butane, toluene and decane. The fuel cell of the preferred embodiments normally is operated at about 650-900° C.

The fuel cell of the embodiments can operate successfully with hydrocarbons containing up to 5000 ppm sulfur. Commercial gasoline is a suitable fuel. Depending upon state regulations and other requirements, commercial gasoline typically has about 300 ppm sulfur, but may have, for example, sulfur concentrations of less than about 10 ppm, about 10 ppm, about 20 ppm, or about 100 ppm.

Figure 10:
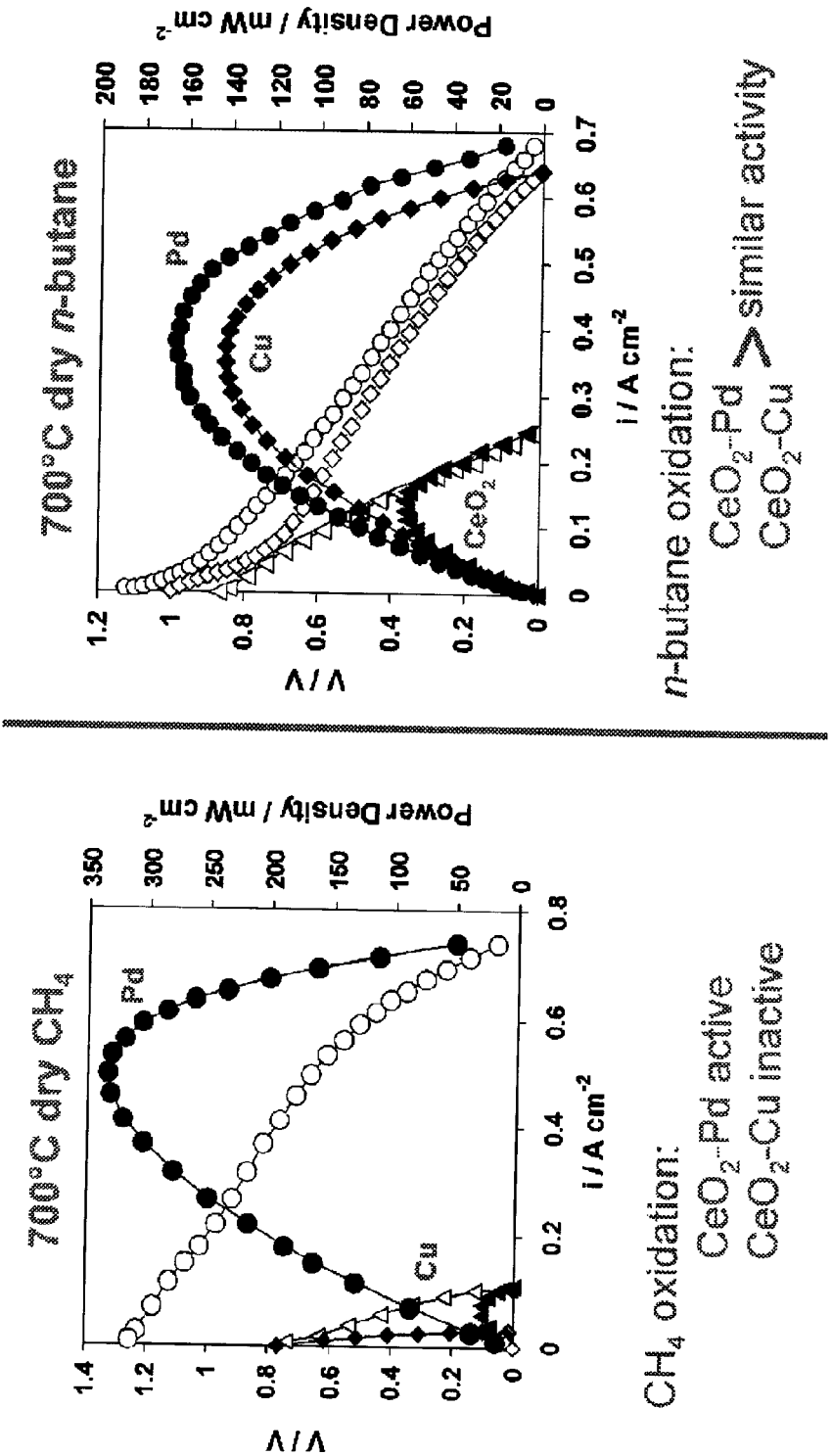
FIG. 10. V-i polarization curves in dry methane and dry n-butane illustrating the effect of varying catalysts.

As discussed above, the catalytic oxides (such as $CeO_2$, doped CeO, $CeO_2$—$ZrO_2$ mixtures, $Pr_6O_{11}$, $TbO_2$, etc.) may be doped with small amounts of catalytic metal to increase their catalytic activity. Examples of catalytic metals include precious metals (e.g., platinum, palladium, rhodium, ruthemium, etc.), semi-precious metals (e.g., nickel, iron, cobalt, copper, etc.), and mixtures. FIG. 10 illustrates how the type of hydrocarbon fuel on which the fuel cells of the present invention operate will determine the type of catalyst utilized in the electro-catalytic layer of the anode. When dry methane is used, Cu is ineffective. However, both Cu and Pd are effective when dry n-butane is utilized.

Design of the SOFC

The embodiments detailed in this disclosure are not particularly limited to any design of the SOFC. Several different designs for solid oxide fuel cells have been developed, including, for example, a supported tubular design, a segmented cell-in-series design, a monolithic design, and a flat plate design. All of these designs are documented in the literature, including, for example, those described in Minh, "High-Temperature Fuel Cells Part 2: The Solid Oxide Cell," Chemtech., 21:120-126 (1991). The SOFC of the present invention may be prepared using any desired design. Using the guidelines provided herein, those skilled in the art will be capable of fabricating the SOFC and anode of the present invention with any desired design configuration.

The following examples are illustrative, but not limiting, of the methods and compositions of the present invention. Other suitable modifications and adaptations of the variety of conditions and parameters normally encountered in therapy and that are obvious to those skilled in the art are within the spirit and scope of the embodiments.

EXAMPLE 1

Figure 9:
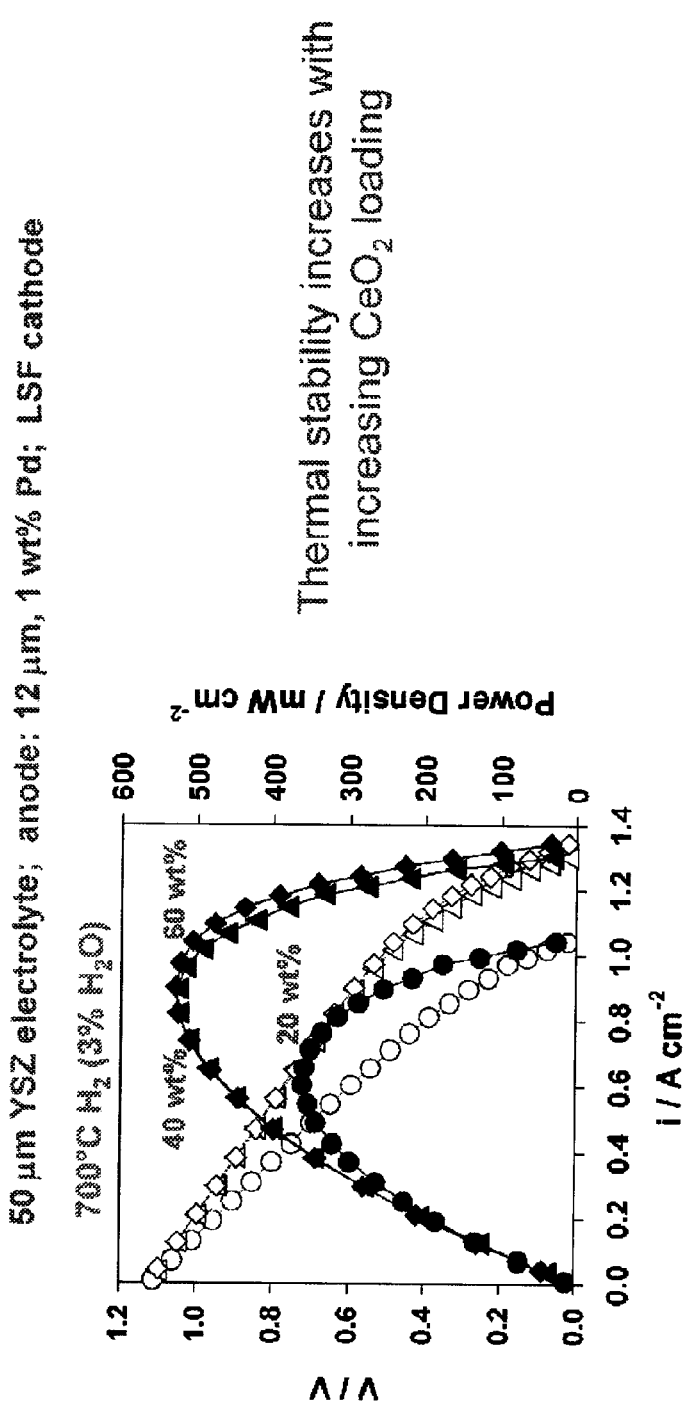
FIG. 9. V-i polarization curves from a cell with a 12 μm 1 wt % anode with a LSF cathode in humidified $H_2$ (3% $H_2O$) at 700° C. Data are shown for the following ceria loading amounts: circles, 20 wt % $CeO_2$; diamonds 40 wt % $CeO_2$; and squares, 60 wt % $CeO_2$.

Proof that outstanding performance can be achieved in humidified (3% $H_2O$) $H_2$ using a cell with a thin ceramic electro-catalytic layer with limited electronic conductivity is shown from the V-i polarization curves and impedance spectra in FIG. 3. The electro-catalytic layer for the cell used in this study was 12 µm thick and was formed by aqueous impregnation of a 65% porous YSZ layer with 40-wt % $CeO_2$ and 1-wt % Pd. Ag paste was used for anode current collection. The electrolyte was 75-µm thick YSZ, and the 300-µm thick cathode was a composite of $La_{0.8}Sr_{0.2}FeO_3$ (LSF) and YSZ (40 wt % LSF by way of impregnation). A composite of Pd, ceria, and YSZ was chosen for the anode electro-catalytic layer in this study because Pd/ceria is one of the most active hydrocarbon-oxidation catalysts. See Trovarelli, A., Catalytic properties of ceria and $CeO_2$-containing materials. *Catalysis Reviews-Science and Engineering*, 38, 439-520 (1996). Composites formed by impregnation into porous YSZ have a CTE similar to YSZ because YSZ forms the backbone of the structure. See Huang, Y., Ahn, K., Vohs, J. M., & Gorte R. J. Characterization of Sr-doped $LaCoO_3$—YSZ composites prepared by impregnation methods. *J. Electrochem. Soc.* 151, A1592-A1597 (2004). FIG. 9 illustrates the effect of ceria concentration on the conductivity of the fuel cell. The V-i polarization curves indicate that thermal stability increases with increased $CeO_2$ loading. A loading of 20 wt % provides insufficient conductivity.

Figure 3A:
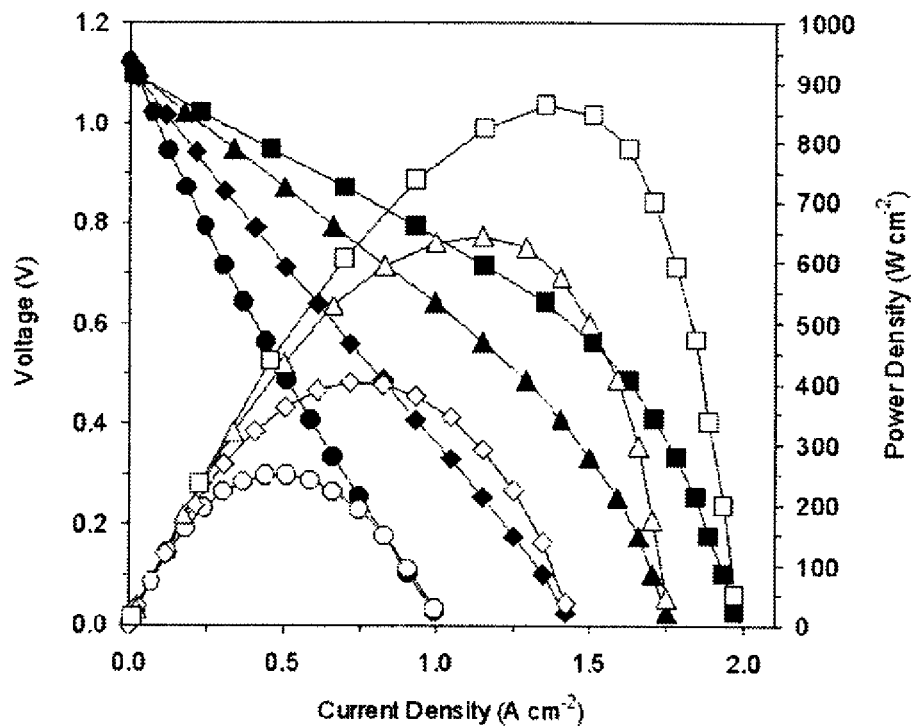
FIG. 3A. V-i polarization curves from a 12 μm Ce—Pd—YSZ anode with a Ag current collector in humidified $H_2$ (3% $H_2O$). Data are shown for the following temperatures: circles, 923 K; diamonds, 973 K; triangles, 1023 K; and squares, 1073 K.

FIG. 3A shows that the V-i polarization curves were linear at the lower current densities and that reasonable power densities, 249 $mW/cm^2$ at 923 K and 865 $mW/cm^2$ at 1073 K, could be reached at intermediate temperatures, even using a relatively thick YSZ electrolyte. Information on factors that limit cell performance can be obtained from the Cole-Cole Plots of the impedance spectra in FIG. 3B. The ohmic resistances of the cell are obtained from the high-frequency intercepts with the abscissa in the Cole-Cole plots, while the total cell resistances, which are equal to the slopes of the V-i curves, are equal to the low-frequency intercepts with the abscissa. The results indicate that the cell losses are dominated by ohmic losses, which arise primarily from the 75-µm thick electrolyte. Using the reported conductivity of YSZ at 973 K, 0.021 S/cm (McIntosh, S., Vohs, J. M., & Gorte, R. J. Impedance spectroscopy for the characterization of Cu-Ceria-YSZ anodes for SOFCs. *Journal of the Electrochemical Society*, 150, A1305-A1312 (2003)), the resistance associated with the electrolyte is 0.36 $\Omega \cdot cm^2$, somewhat lower than the observed ohmic resistance of 0.49 $\Omega \cdot cm^2$. Since the total cell impedance at 973 K, is 0.71 $\Omega \cdot cm^2$, the total electrode losses at 973 K, which include losses from the cathode, are less than 0.4 $\Omega \cdot cm^2$.

Figure 3B:
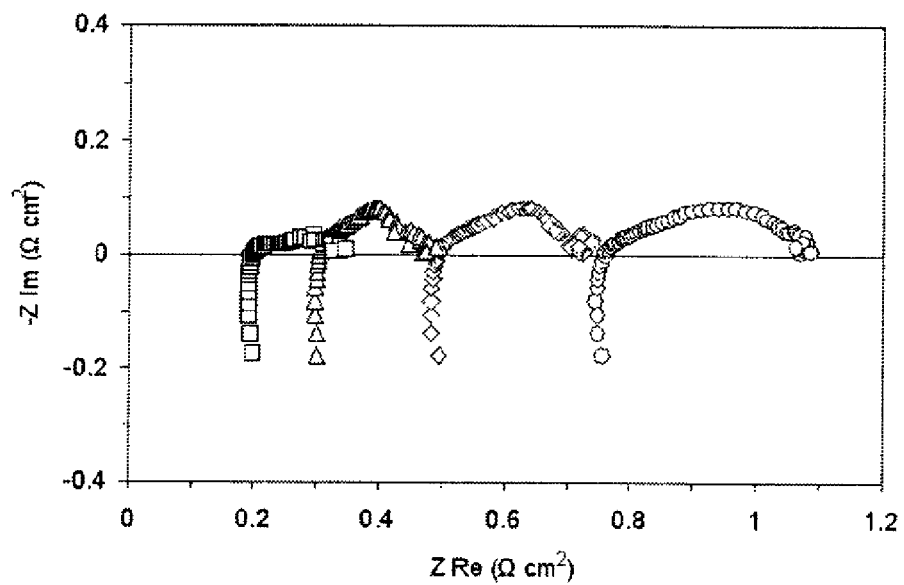
FIG. 3B. Impedance spectra from a 12 μm Ce—Pd—YSZ anode with a Ag current collector in humidified $H_2$ (3% $H_2O$). Data are shown for the following temperatures: circles, 923 K; diamonds, 973 K; triangles, 1023 K; and squares, 1073 K.

The addition of dopant levels of a catalytic metal, Pd in this case, is crucial for achieving high catalytic activity with ceria and the high performance in FIGS. 3a and 3b. To demonstrate the effect of a catalytic metal, a second cell was prepared that was identical to the first, but without Pd. The maximum power densities and ohmic resistances in humidified $H_2$ are listed in the table of FIG. 6. At each temperature studied, the maximum power densities were lower by a factor of approximately four when Pd is absent. The ohmic resistances were also slightly larger (e.g. At 973 K, the ohmic resistance was 0.55 $\Omega \cdot cm^2$ when Pd is absent, compared to 0.49 $\Omega \cdot cm^2$ on the cell with Pd.), but most of the decreased performance was associated with the non-ohmic, electrode polarization losses. Because the amount of added Pd was too small to contribute to electrode conductivity in the first cell, it is believed that Pd promotes the reduction of ceria, thereby slightly increasing the conductivity of the electrode (The cell performance without Pd is still much better than has been reported by most other researchers using ceramic anodes and there may be cases where the performance without Pd is sufficient for the electro-catalytic layer.)

EXAMPLE 2

To test the effect of anode electro-catalytic layer thickness, another cell was prepared with 1-wt % Pd and 40-wt % ceria, but using a 50-µm (rather than 12-µm) thick, porous YSZ layer. Again, the maximum power densities and ohmic resistances are listed in the table of FIG. 6. The maximum power densities decreased with the increased thickness of the electro-catalytic layer and at least some of the lost performance is due to increased ohmic resistances. For example, at 973 K, the ohmic resistance increased from 0.47 $\Omega \cdot cm^2$ to 0.74 $\Omega \cdot cm^2$. Calculating the conductivity of the electro-catalytic layer from the differences in the ohmic resistances and the electro-catalytic layer thickness, we obtain a value of 0.015 S/cm, a value well below that normally targeted for the conductivity of anode materials and also well below that expected for the conductivity bulk ceria under these conditions. See Atkinson, A. et al. Advanced anodes for high-temperature fuel cells. *Nature Mater.* 3, 17-27 (2004). Conventional materials exhibit conductivity from of 50-400 S/cm. In one embodiment, the conductivity of the anode of the present invention is less than 10 S/cm, in an additional embodiment less than 1.0 S/cm, and in yet an additional embodiment less than 0.1 S/cm. The increase in the non-ohmic impedance with thickness of the electro-catalytic layer is probably related to the poor conductivity of this layer, given that a similar increase has been reported in the non-ohmic losses following sintering in Cu-based anodes. See Jung, S., Lu, C., He, H., Ahn, K., Gorte, R. J., & Vohs, J. M. Influence of composition and Cu impregnation method on the performance of $Cu/CeO_2/YSZ$ SOFC anodes. *J. Power Sources* 154, 42-50 (2006).

Figure 4A:
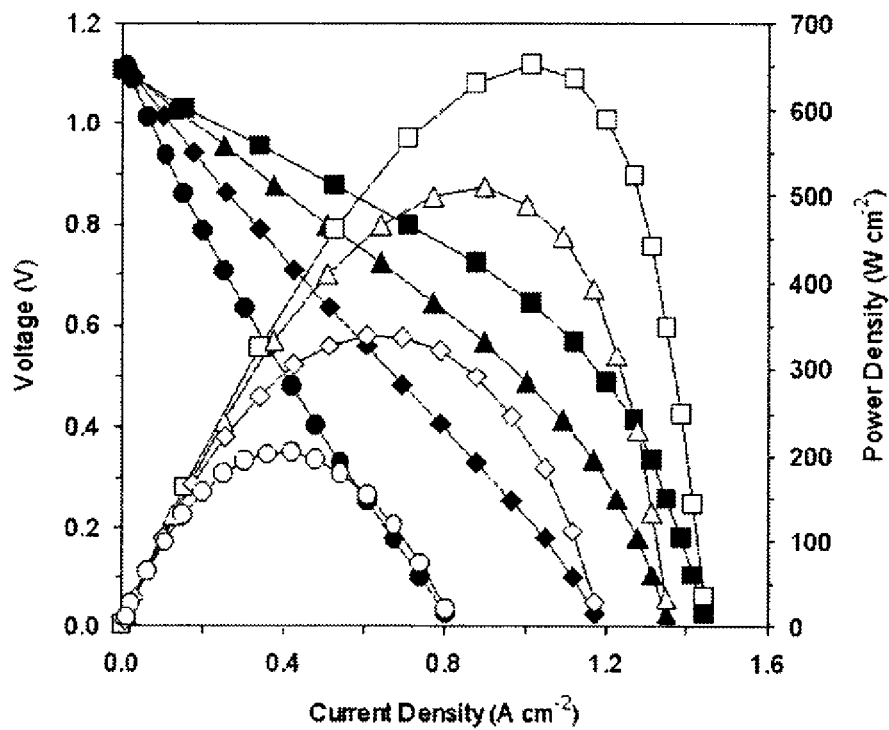
FIG. 4A. V-i polarization curves from a 12 μm Ce—Pd—YSZ anode with a LST current collector in humidified $H_2$ (3% $H_2O$). Data are shown for the following temperatures: circles, 923 K; diamonds, 973 K; triangles, 1023 K; and squares, 1073 K.
Figure 4B:
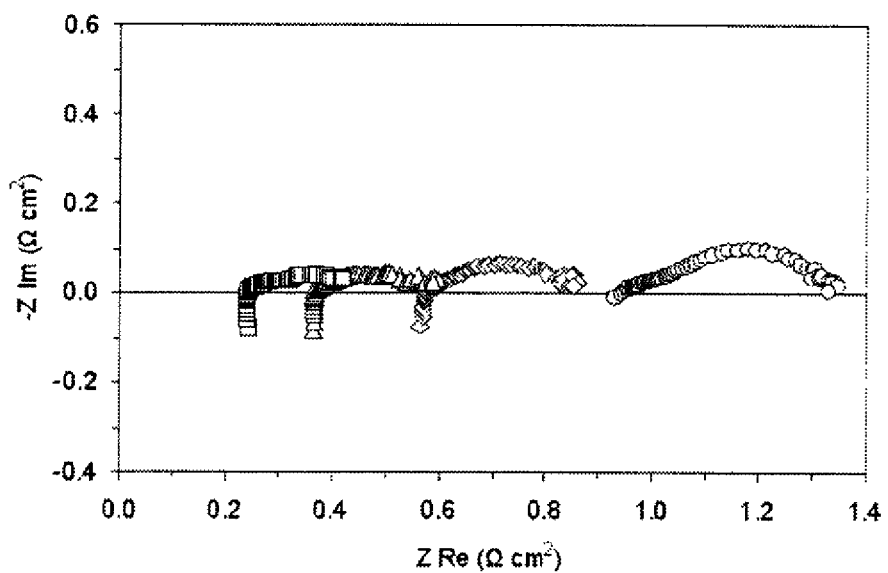
FIG. 4B. Impedance spectra from a 12 μm Ce—Pd—YSZ anode with a LST current collector in humidified $H_2$ (3% $H_2O$). Data are shown for the following temperatures: circles, 923 K; diamonds, 973 K; triangles, 1023 K; and squares, 1073 K.
Figure 7:
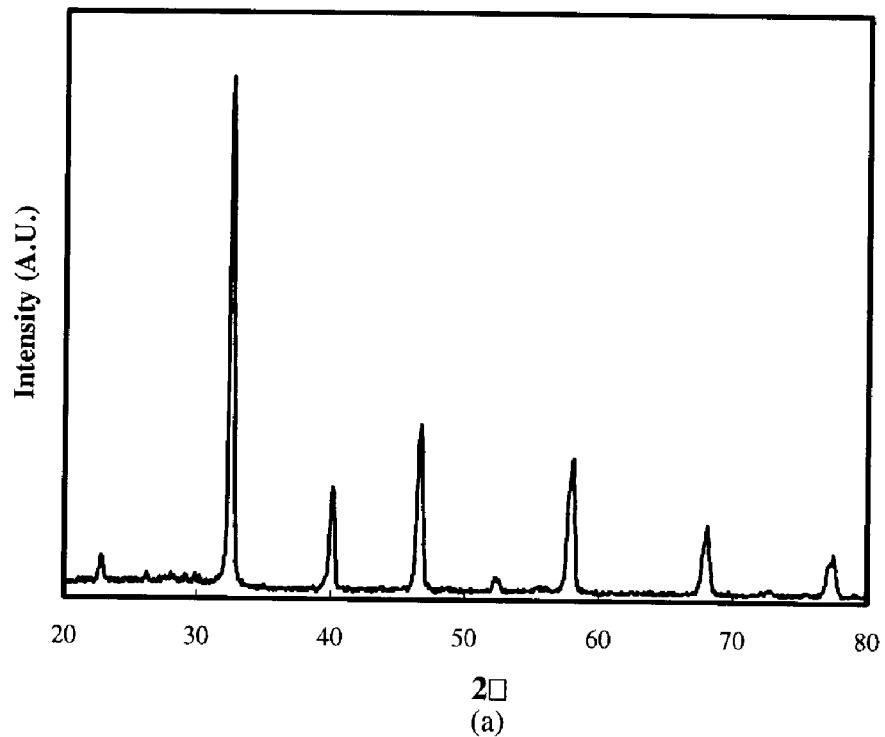
FIG. 7A. The x-ray diffraction (XRD) pattern of $La_{0.3}Sr_{0.7}TiO_3$ calcined at 1200° C. for 3 h in air.
FIG. 7B. The x-ray (XRD) pattern of a $La_{0.3}Sr_{0.7}TiO_3$—YSZ composite calcined at 1550° C. for 4 h in air.
Figure 7:
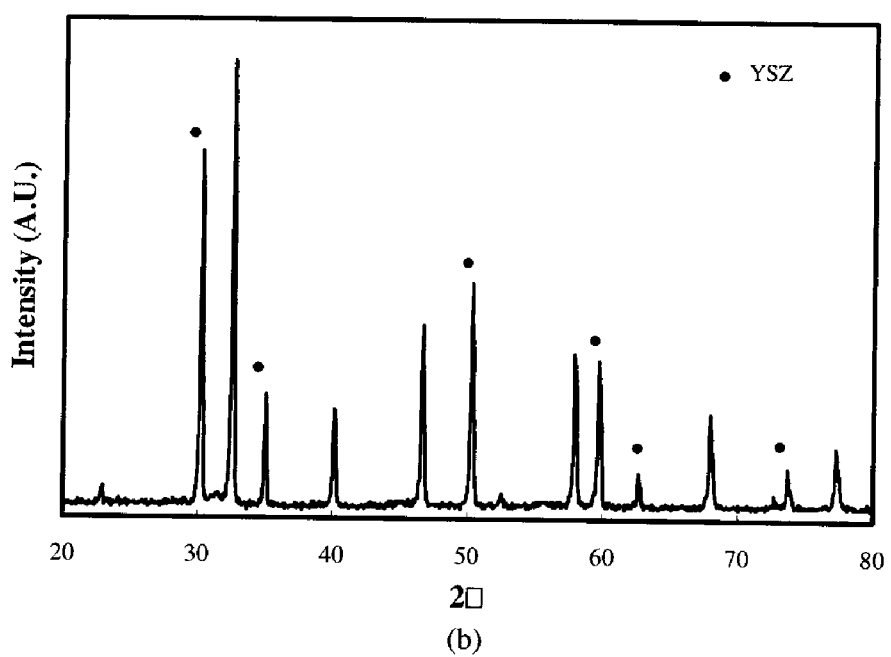

The Ag paste in the cells described immediately above is believed to play a crucial role and in a preferred embodiment could be considered part of the anode. To determine the effect of using an electronically conductive ceramic in the current-collection layer, a cell was prepared with the same 12-µm electro-catalytic layer as discussed in Example 1 (1-wt % Pd and 40-wt % ceria in YSZ) and a 100-µm current-collection layer of porous $La_{0.3}Sr_{0.7}TiO_3$ (LST). LST was chosen for this study because it has a similar CTE to that of YSZ and does not react with YSZ, even after co-firing at 1823 K. See He, H. Huang, Y., Vohs, J. M. & Gorte, R. J. Characterization of YSZ-YST Composites for SOFC Anodes. *Solid State Ionics*, 175, 171-176 (2004). The XRD shown in FIG. 7 shows that the LST does not react with the YSZ so that no insulating barriers are formed. Furthermore, LST has no ionic conductivity and is a poor electrocatalyst, so that there is no ambiguity about the role that this layer plays. However, choosing a material with ionic conductivity as well as electronic conductivity for the electro-conductive layer would be beneficial, but not necessary. No special reduction of the LST was carried out to improve its conductivity. Performance data for the LST cell in humidified $H_2$ and humidified $CH_4$ are shown in FIGS. 4 and 5.

In $H_2$, the power densities achieved with the LST current collector were slightly lower than that with the Ag current collector, but still quite respectable. For example, the maximum power densities at 973 K and 1073 K were 339 and 653 mW/cm$^2$, respectively. Considering the impedance data for the cells with LST (FIG. 4B) and Ag (FIG. 3B) current collectors, the performance differences are due primarily to a slightly higher ohmic resistance in the cell with the LST current collector. For example, at 973 K, the LST cell had an ohmic resistance of 0.58 Ω·cm$^2$, compared to 0.49 Ω·cm$^2$ in the cell with an Ag current collector. The non-ohmic impedance for the two cells at 973 K were similar, 0.27 Ω·cm$^2$ on the LST cell and 0.22 Ω·cm$^2$ in the Ag cell.

Figure 5A:
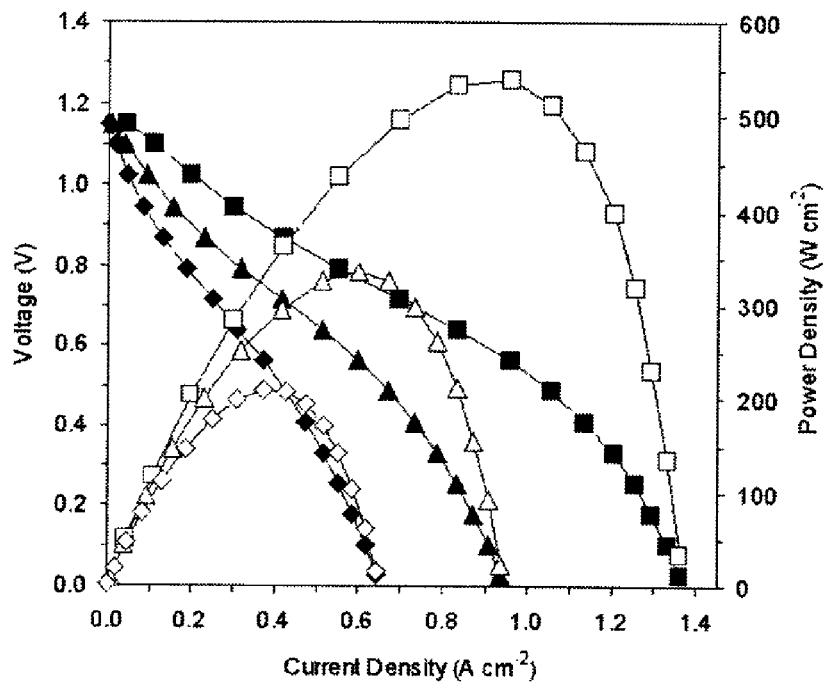
FIG. 5A. V-i polarization curves from a 12 μm Ce—Pd—YSZ anode with a LST current collector in humidified $CH_4$ (3% $H_2O$). Data are shown for the following temperatures: diamonds, 973 K; triangles, 1023 K; and squares, 1073 K.
Figure 5B:
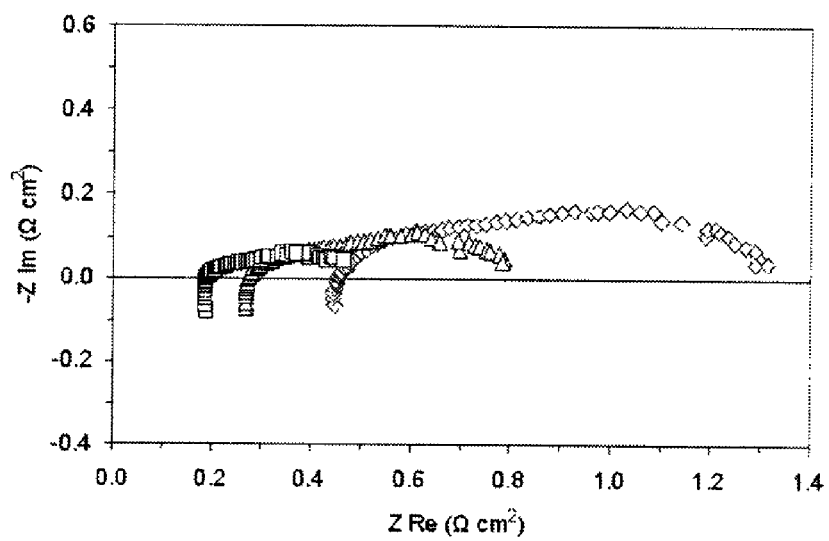
FIG. 5B. Impedance spectra from a 12 μm Ce—Pd—YSZ anode with a LST current collector in humidified $CH_4$ (3% $H_2O$). Data are shown for the following temperatures: diamonds, 973 K; triangles, 1023 K; and squares, 1073 K.

Because one of the goals in using a ceramic anode is to operate in hydrocarbon fuels, we also tested the LST cell in humidified (3% H$_2$O added to establish a consistent partial pressure of oxygen on the anode side and thereby assure consistent testing conditions) CH$_4$, with the results shown in FIG. 5. Since the fuel utilization in these tests was less than 1%, negligible amounts of water were generated in the anode. The first intriguing aspect of the data is that the open-circuit voltages (OCV) at each temperature were greater than 1.15 V, a value higher than that which can be achieved theoretically with humidified H$_2$ or CO. Therefore, the high OCV cannot be explained by considering the electrochemical reaction to be occurring through a reforming process and suggests direct oxidation of the hydrocarbon. Second, the maximum power densities approach that observed with humidified H$_2$, with maximum power densities of 208 mW/cm$^2$ at 973 K and 539 mW/cm$^2$ at 1073 K. Finally, the anode exhibited no evidence of carbon formation during overnight operation with CH$_4$.

This study demonstrates that one can obtain excellent performance using anodes with a thin electro-catalytic layer and a separate electro-conductive layer, even if the conductivity of the electro-catalytic layer is low. The part of the anode responsible for current collection can be treated separately, allowing materials in each layer to be optimized independently. This strategy of designing each layer in the anode independently allows much greater flexibility in electrode design.

EXAMPLE 3

The following Example provides a general approach for cell synthesis involving the synthesis of the electrodes by impregnation of porous YSZ. See Gorte, R. J., Park, S., Vohs, J. M., and Wang, C. H. Anodes for direct oxidation of dry hydrocarbons in a solid-oxide fuel cell. *Adv. Mater.* (Weinheim, Ger.) 12, 1465-1469 (2000). The first step involves synthesizing a YSZ substrate with two porous layers separated by a dense layer. In this study, the dense layer was 75-μm thick and the two porous layers were 300-μm and either 12 or 50-μm thick. The YSZ substrates were prepared by laminating together three green tapes, with pore formers included in those tapes requiring porosity. Porosity in the 300-μm layer was obtained using a mixture of graphite and polystyrene pore formers, while the thinner porous layer used only graphite. The tapes were fired to 1823 K for 4 h to produce the YSZ substrate, with porosities of approximately 65% on both sides of the electrolyte. For cells using LST as the current-collection layer of the anode, a glycerol slurry of LST powder with graphite used as a pore former was pasted onto the 12-μm porous YSZ and the cell was then fired again to 1823 K to provide a structure like that shown in FIG. 2.

The LSF-YSZ composite cathodes were then fabricated by impregnation of the 300-μm porous YSZ with aqueous solutions containing La(NO$_3$)$_3$·6H$_2$O, Sr(NO$_3$)$_2$, and Fe(NO$_3$)$_3$·9H$_2$O at a molar ratio of La:Sr:Fe=0.8:0.2:1, followed by calcination above 1073 K. See Huang, Y., Vohs, J. M., Gorte, R. J. Fabrication of Sr-doped LaFeO$_3$ YSZ composite cathodes. *J. Electrochem. Soc.* 151, A646-A651 (2004). Multiple impregnation steps were used to reach a final loading of 40-wt % LSF. The porous YSZ in the anode layer was then impregnated with CeO$_2$ and Pd using the corresponding nitrate salts. Finally, Ag paste and Ag wire were applied to both the anode and cathode sides for current collection.

For fuel-cell testing, the cells were attached to an alumina tube with a ceramic adhesive (Aremco, Ceramabond 552). Impedance spectra were measured at 0.2 A cm$^{-2}$ in the galvanostatic mode with a frequency range of 0.1 Hz to 100 KHz and a 1-mA AC perturbation using a Gamry Instruments potentiostat. The active area of the cells, equal to the anode area, was 0.33 cm$^2$. Either H$_2$ or CH$_4$ was introduced to the anode compartment through a room-temperature, water bubbler for humidification. The fuel flow rates were 50 ml/min for both fuels, resulting in fuel utilizations of less than 7% for H$_2$ and less than 1% for CH$_4$.

EXAMPLE 4

Figure 11:
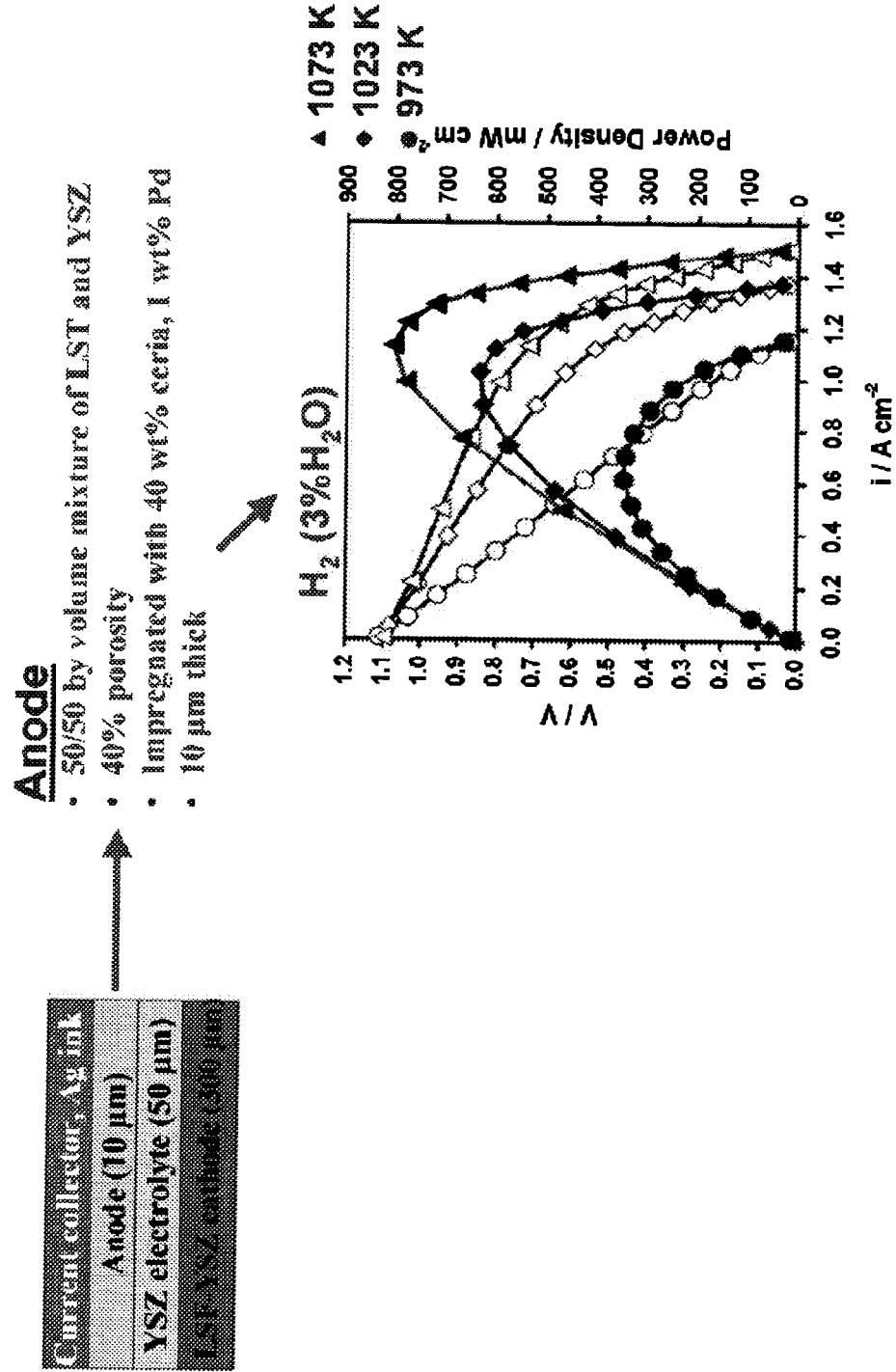
FIG. 11. Graphical representation of mixed conducting anode matrix (LST/YSZ) including V-i polarization curves in humidified $H_2$ (3% $H_2O$).
Figure 14:
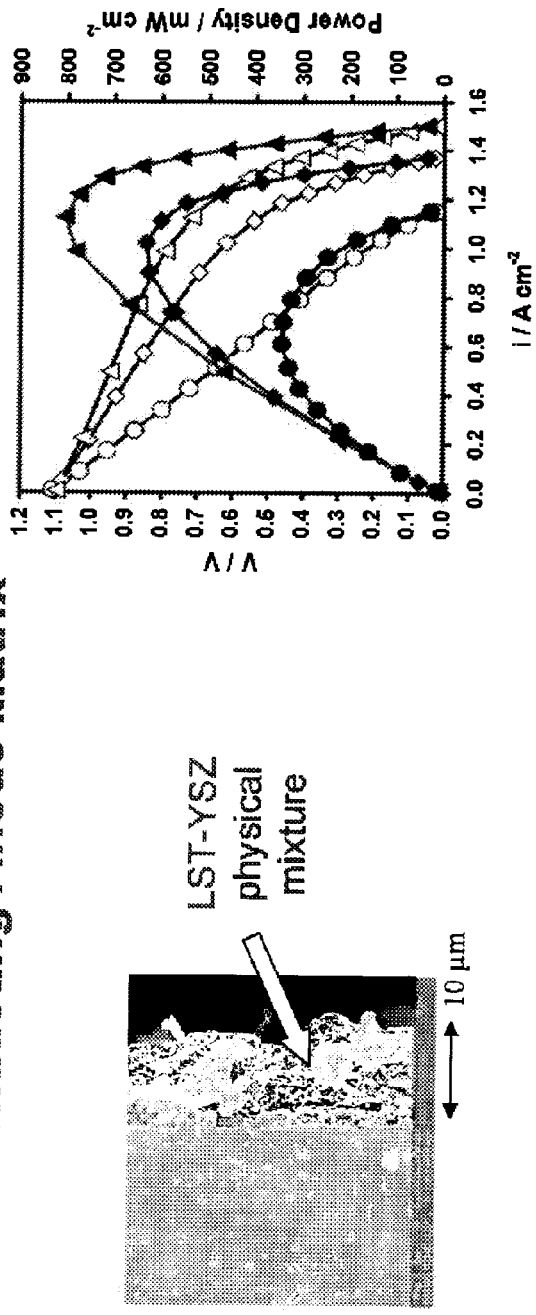
FIG. 14. Scanning electron micrograph (SEM), V-i polarization curves and impedance spectra illustrating the mixed conduction anode matrix (LST-YSZ).
Figure 14:
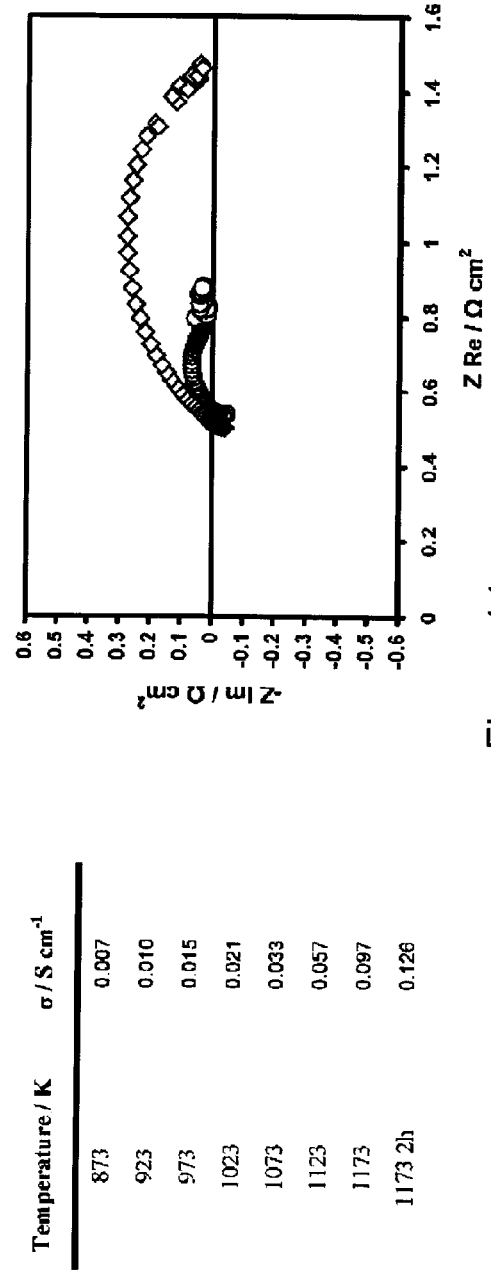

To test the effectiveness of an anode composed of a mixture of LST and YSZ, a cell was prepared with a 300-μm LSF-YSZ cathode, a 50-μm YSZ electrolyte and 10-μm anode composed of 50/50 volume mixture of LST and YSZ. The mixture was prepared at 40% porosity and impregnated with 40 wt % ceria, 1 wt % Pd. The V-i polarization curves measured in H$_2$ (3% H$_2$O) are illustrated in FIGS. 11 and 14 and indicate sufficient conductivity at higher temperatures. This performance data is similar to those cells without the LST-YSZ mixture (i.e., just YSZ).

In an additional embodiment of the present invention, the anode is prepared from a 50/50 volume mixture of YSZ and La$_{0.3}$Sr$_{0.7}$TiO$_3$ (LST). The resulting anode provides similar electric functions without loosing stability. See FIGS. 11-14.

Figure 12:
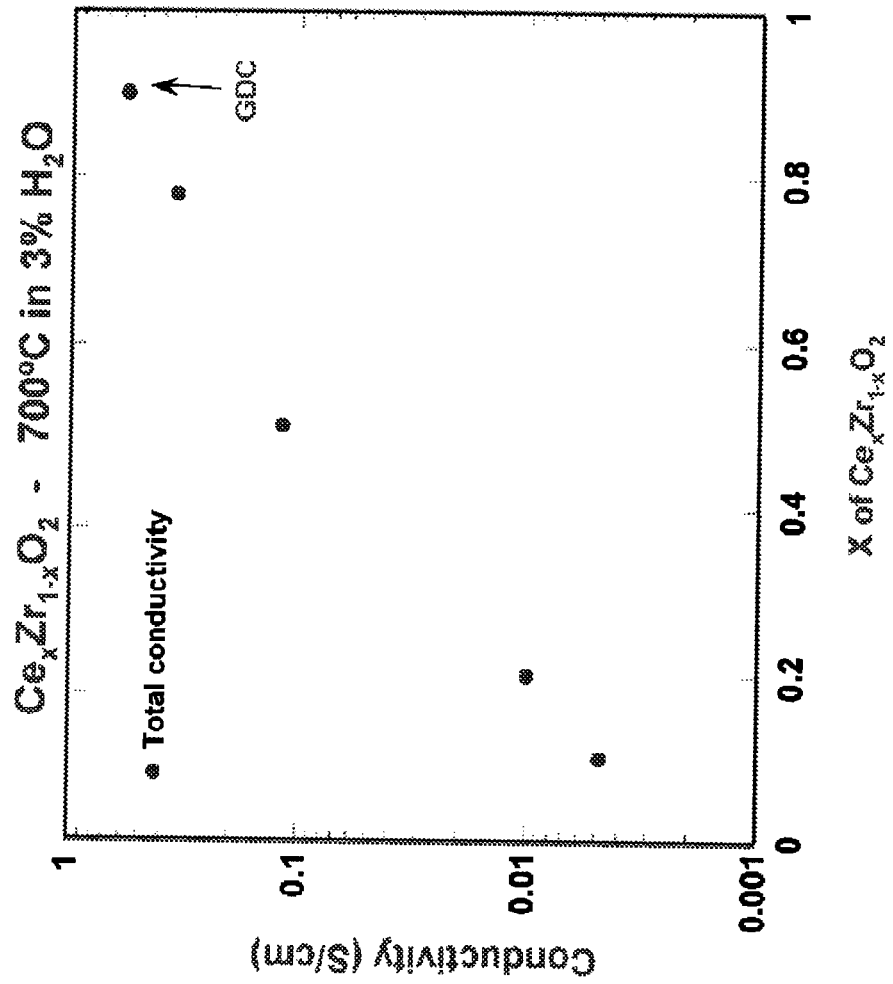
FIG. 12. Graphical representation of mixed Ceria-Zirconia conductivity.

To further test the effectiveness of the conductivity of mixed anode compositions, mixed ceria-zirconia (Ce$_x$Zr$_{1-x}$O$_2$) anodes were tested. The conductivity of solid ceria-zirconia mixtures were tested at 700° C. and 3% H$_2$O. FIG. 12 illustrates that, as above, the performance is similar to those cells without the mixture (i.e., just YSZ).

Figure 13:
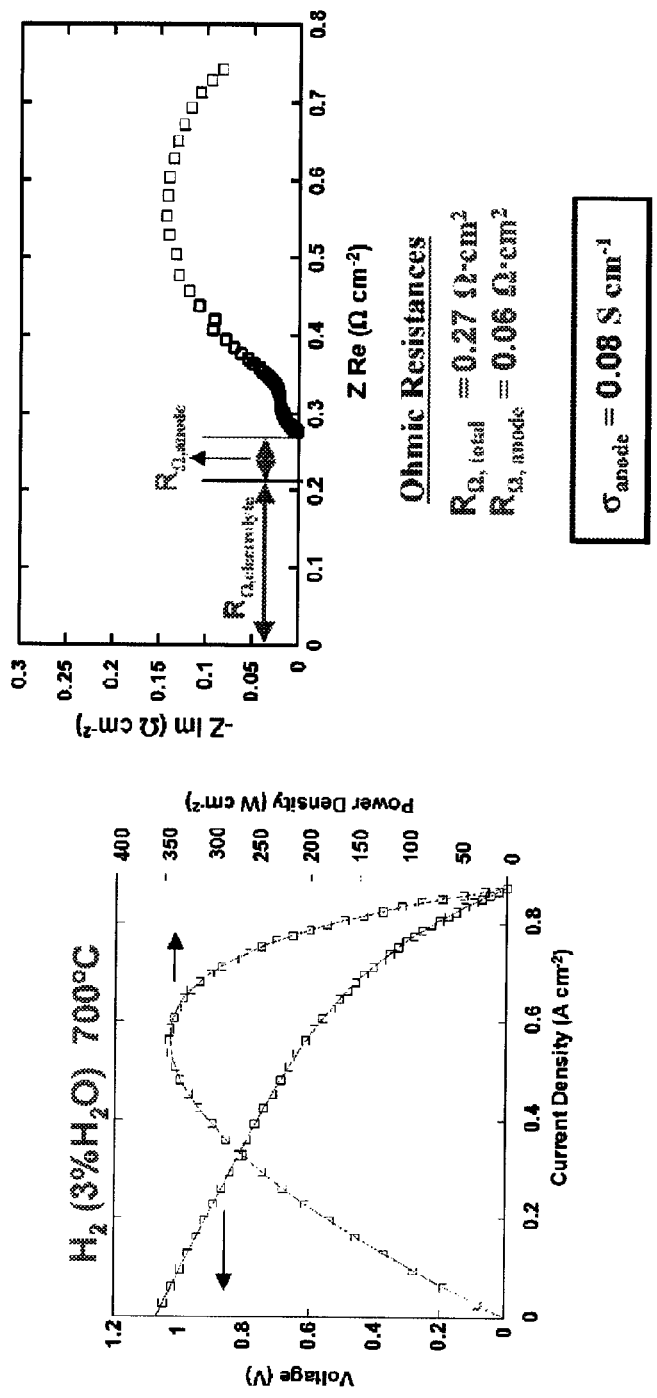
FIG. 13. V-i polarization curves and impedance spectra of mixed ceria-zirconia anode matrix ($Ce_xZr_{1-x}O_2$) in humidified $H_2$ (3% $H_2O$)

A cell was prepared utilizing the mixed ceria-zirconia (Ce$_x$Zr$_{1-x}$O$_2$) anode described above and tested for conductivity. The results are shown in FIG. 13. The cell was comprised a 300-μm LSF-YSZ cathode, a 40-μm YSZ electrolyte and a 50-μm anode comprising Ce$_{0.5}$Zr$_{0.5}$O$_2$ at 40% porosity. The anode was impregnated with 40 wt % ceria and 1 wt % Pd. The V-i polarization curves and impedance spectra indicate that even at 50-μm, the cell has acceptable ohmic resistance and acceptable performance. In another embodiment, the mixed ceria-zirconia is doped with elements such as yttria.

While the embodiments have been described with reference to particularly preferred embodiments and examples, those skilled in the art recognize that various modifications may be made to the invention without departing from the spirit and scope thereof.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

What is claimed is:

1. A ceramic anode comprising a catalytically reactive layer that is adjacent to and in contact with the electrolyte and that has a conductivity of less than 10 S/cm, wherein the catalytically reactive layer has a conductivity of less than 1.0 S/cm.

2. The anode of claim 1, wherein the catalytically reactive layer has a conductivity of less than 0.1 S/cm.

3. The anode of claim 1, wherein the catalytically reactive layer is a electrocatalytic layer having a thickness from about 1 μm to about 50 μm.

4. The anode of claim 3, wherein the catalytically reactive layer is an electrocatalytic layer having a thickness from about 5 μm to about 20 μm.

5. The anode of claim 4, wherein the electro-catalytic layer has a thickness of about 10 μm.

6. A ceramic anode comprising a catalytically reactive layer that is adjacent to and in contact with the electrolyte and that has a conductivity of less than 10 S/c, wherein the catalytically reactive layer comprises a ceramic material, the ceramic material comprising a 50/50 volume mixture of YSZ and $La_{0.3}Sr_{0.7}TiO_3$.

7. A ceramic anode comprising an electroconductive layer and a catalytically reactive layer that is adjacent to and in contact with the electrolyte and that has a conductivity of less than 10 S/cm, wherein the electroconductive layer is thicker than the catalytically reactive layer.

8. The anode of claim 7, wherein the electroconductive layer comprises ceria, doped ceria, $LaCrO_3$, $SrTiO_3$, Y-doped $SrTiO_3$, La-doped $SrTiO_3$, Sr-doped $LaCrO_3$, $Nb_2TiO_7$ or $Gd_2Ti(Mo,Mn)O_7$ or mixtures thereof.

9. A solid oxide fuel cell comprising:
 (a) a solid electrolyte;
 (b) a cathode material; and
 (c) a ceramic anode,
 wherein the ceramic material of the anode comprises a catalytically reactive layer that is adjacent to and in contact with the electrolyte and that has a conductivity of less than 10 S/cm, and
 wherein the ceramic material comprises a 50/50 volume mixture of YSZ and $La_{0.3}Sr_{0.7}TiO_3$.

* * * * *